(12) United States Patent
Ambrose et al.

(10) Patent No.: US 8,168,738 B2
(45) Date of Patent: May 1, 2012

(54) LOW TEMPERATURE, MOISTURE CURABLE COATING COMPOSITIONS AND RELATED METHODS

(75) Inventors: Ronald R. Ambrose, Loganville, GA (US); Anthony M. Chasser, Allison Park, PA (US); Susan F. Donaldson, Allison Park, PA (US); Ellen C. LaLumere, Pittsburgh, PA (US); Kaliappa G. Ragunathan, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 420 days.

(21) Appl. No.: 12/473,646

(22) Filed: May 28, 2009

(65) Prior Publication Data
US 2009/0232994 A1 Sep. 17, 2009

Related U.S. Application Data

(63) Continuation-in-part of application No. 12/433,167, filed on Apr. 30, 2009, and a continuation-in-part of application No. 12/329,114, filed on Dec. 5, 2008, now abandoned, and a continuation-in-part of application No. 12/329,087, filed on Dec. 5, 2008, now abandoned, said application No. 12/433,167 is a continuation-in-part of application No. 11/839,165, filed on Aug. 15, 2007, now abandoned, and a continuation-in-part of application No. 11/839,155, filed on Aug. 15, 2007, now Pat. No. 7,868,120.

(60) Provisional application No. 60/826,431, filed on Sep. 21, 2006.

(51) Int. Cl.
*C08G 77/26* (2006.01)

(52) U.S. Cl. .............. 528/26; 528/32; 528/38

(58) Field of Classification Search ............ 528/26, 528/32, 38
See application file for complete search history.

(56) References Cited

U.S. PATENT DOCUMENTS

| | | |
|---|---|---|
| 3,997,485 A | 12/1976 | Dowbenko |
| 4,043,953 A | 8/1977 | Chang |
| 4,239,539 A | 12/1980 | Ginsberg |
| 4,250,074 A | 2/1981 | Foscante |
| 4,429,082 A | 1/1984 | Lee |
| 4,477,628 A | 10/1984 | Kato |
| 4,499,151 A | 2/1985 | Dowbenko |
| 4,603,086 A | 7/1986 | Fujii |
| 4,678,835 A | 7/1987 | Chang |
| 4,697,026 A | 9/1987 | Lee |
| 5,025,049 A | 6/1991 | Takarada |
| 5,260,350 A | 11/1993 | Wright |
| 5,403,535 A | 4/1995 | Blizzard |
| 5,648,173 A | 7/1997 | Blizzard |
| 5,703,178 A | 12/1997 | Gasmena |
| 5,965,272 A | 10/1999 | Donnelly |
| 6,203,607 B1 | 3/2001 | Schoonderwoerd |
| 6,268,456 B1 | 7/2001 | Gregorovich |
| 6,281,321 B1 | 8/2001 | Kelly |
| 6,344,520 B1 | 2/2002 | Sugano |
| 6,514,584 B1 | 2/2003 | Merlin |
| 6,599,354 B1 | 7/2003 | Schmalstieg |
| 6,713,586 B2 | 3/2004 | Greene |
| 6,936,676 B2 | 8/2005 | Okuhira |
| 7,026,398 B2 | 4/2006 | Monkiewicz |
| 7,064,174 B2 | 6/2006 | Lewis |
| 2003/0176584 A1 | 9/2003 | Maruyama |
| 2004/0219303 A1 | 11/2004 | Wissing |
| 2006/0058451 A1 | 3/2006 | Gommans |
| 2007/0099002 A1 | 5/2007 | Walters |
| 2009/0078156 A1 | 3/2009 | Chasser et al. |

FOREIGN PATENT DOCUMENTS

| | | |
|---|---|---|
| CA | 2141515 | 8/1995 |
| CA | 2141516 | 12/1995 |
| DE | 19929011 A1 | 12/2000 |
| EP | 0354378 B1 | 1/1994 |
| JP | 08-107448 A | 4/1996 |
| JP | 09291135 A | 11/1997 |
| JP | 2001055443 A | 2/2001 |
| JP | 2001064468 | 3/2001 |
| JP | 2001064468 A | 3/2001 |
| JP | 2003238795 A | 8/2003 |
| JP | 2004323660 A | 11/2004 |
| WO | WO 96/16109 | 5/1996 |
| WO | WO 01/44381 A1 | 6/2001 |
| WO | WO 2004/078863 A1 | 9/2004 |
| WO | 2007085622 | 8/2007 |

OTHER PUBLICATIONS

Translation of JP 09 291135, (Nov. 11, 1997).*
Liu, Hongbo et el., "The Influence of Silicon-Containing Acrylate as Active Diluent on the Properties of UV-Cured Epoxydiacrylate Films", European Polymer Journal 40 (2004) 609-613.
Müh, Ekkehard et al., "Bismethacrylate-Based Hybrid Monomers via Michael-Addition Reactions", Macromolecules 2001, 34, 5778-5785.

\* cited by examiner

*Primary Examiner* — David M Brunsman
(74) *Attorney, Agent, or Firm* — Donald R. Palladino

(57) ABSTRACT

Disclosed are low temperature, moisture curable coating compositions, related coated substrates, and methods for coating a substrate. The coating compositions include an ungelled, secondary amine-containing Michael addition reaction product of reactants including a compound comprising more than one site of ethylenic unsaturation, and an aminofunctional silane.

20 Claims, No Drawings

LOW TEMPERATURE, MOISTURE CURABLE COATING COMPOSITIONS AND RELATED METHODS

CROSS-REFERENCE TO RELATED APPLICATIONS

This application is a continuation-in-part of U.S. patent application Ser. No. 12/433,167, filed Apr. 30, 2009, which is a continuation-in-part of Ser. Nos. 11/839,155 now U.S. Pat. No. 7,868,120 and 11/839,165 now abandoned, both filed Aug. 15, 2007, both of which claim the benefit of U.S. Provisional Patent Application Ser. No. 60/826,431, filed Sep. 21, 2006, each of which being incorporated herein by reference. This application is a continuation-in-part of U.S. patent application Ser. Nos. 12/329,114 now abandoned and 12/329,087 now abandoned, both filed Dec. 5, 2008, both of which also being incorporated herein by reference. This application is also a continuation-in-part of U.S. patent application Ser. No. 12/433,167, filed Apr. 30, 2009, which is also incorporated herein by reference.

FIELD OF THE INVENTION

The present invention relates to coating compositions, such as low temperature, moisture curable coating compositions, related coated substrates, and methods for depositing a coating on a substrate.

BACKGROUND INFORMATION

Low temperature, moisture-curable coating compositions are desirable in many applications. For example, such coating compositions are, in at least some cases, preferable over, for example, thermally-cured or radiation cured coating compositions because (i) little or no energy is required to cure the composition, (ii) the materials from which some substrates are constructed cannot withstand elevated temperature cure conditions, and/or (iii) large or complex articles to be coated may not be convenient for processing through thermal or radiation cure equipment.

Some coating compositions are based on the hydrolysis and condensation of silane based materials that form a crosslinked Si—O—Si matrix. These compositions often form hard, highly crosslinked films, which are limited in flexibility. Therefore, the resultant coatings are often susceptible to chipping or thermal cracking due to embrittlement of the coating film. Moreover, such films can be especially unsuitable for use in coating substrates that can bend or flex, such as elastomeric automotive parts and accessories, for example, elastomeric bumpers and body side moldings, as well as consumer electronics equipment, among other things. The coating compositions applied to such elastomeric substrates typically must be very flexible so the coating can bend or flex with the substrate without cracking.

As a result, it would be desirable to provide low temperature, moisture curable coating compositions that are capable of producing a flexible, crack resistant coating when applied to a substrate and cured. Moreover, it would be desirable to provide such coating compositions that are, in at least some cases, substantially solvent free, sprayable at room temperature, and/or storage stable. In addition, it would be desirable to provide means for improving certain properties of such coating compositions, such as the initial (within 6 hours after application) scratch resistance of coatings deposited from such compositions without significantly detrimentally impacting other coating properties, such as appearance, flexibility and adhesion.

SUMMARY OF THE INVENTION

In certain respects, the present invention is directed to coating compositions. These coating compositions comprise: (a) a saturated polymer comprising silyl functional groups and having a silyl equivalent weight of at least 150; (b) an ungelled, secondary amine-containing, Michael addition reaction product of reactants comprising: (i) a compound comprising more than one site of ethylenic unsaturation, and (ii) an aminofunctional silane; and (c) a compound comprising functional groups reactive with secondary amine groups.

The present invention is also related to, inter alia, substrates at least partially coated with such compositions and methods for coating substrates with such compositions.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to coating compositions, such as low temperature, moisture curable coating compositions. As used herein, the term "low temperature, moisture curable" refers to coating compositions that, following application to a substrate, are capable of curing in the presence of ambient air, the air having a relative humidity of 10 to 100 percent, such as 25 to 80 percent, and a temperature in the range of −10 to 120° C., such as 5 to 80° C., in some cases 10 to 60° C. and, in yet other cases, 15 to 40° C. As used herein, the term "cure" refers to a coating wherein any crosslinkable components of the composition are at least partially crosslinked. In certain embodiments, the crosslink density of the crosslinkable components, i.e., the degree of crosslinking, ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As will also be appreciated by those skilled in the art, the degree of cure can be determined by testing the solvent resistance of a coating to double rubs of methyl ethyl ketone. The higher the number of double rubs with no damage to the coating, the greater the degree of cure. In this test, an index finger holding a double thickness of cheesecloth saturated with methyl ethyl ketone is held at a 45° angle to the coating surface. The rub is made with moderate pressure at a rate of 1 double rub per second. As used herein, when it is stated that a coating is "completely cured" it means that the coating is resistant to 100, in some cases 200, double rubs of methyl ethyl ketone according to the foregoing procedure, with no damage to the coating.

The coating compositions of the present invention comprise a saturated polymer comprising silyl functional groups. As used herein, the term "polymer" refers to prepolymers, oligomers and both homopolymers and copolymers. The prefix "poly" as used herein refers to two or more. As used herein, the term "saturated polymer" refers to a polymer containing no carbon-carbon double bonds in the polymer backbone. As used herein, the term "silyl functional group" refers to a group having the structure:

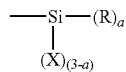

where R is a hydrogen or a monovalent hydrocarbon group, X is alkoxy, acyloxy, phenoxy, or thioalkoxy and "a" is an integer from 0 to 2, wherein if "a" is 2, the two R groups can be the same or different and when "a" is 0 or 1, the two or three X groups can be the same or different.

The silyl group-containing saturated polymer can be of virtually any length and complexity so long as the molecule does not interfere with desired film-forming and curing properties of the coating composition. The polymer can be, without limitation, an acrylic, polyester, polyether, polysiloxane, urethane or combination thereof, so long as the polymer contains unreacted silyl groups attached thereto. In certain embodiments, however, the polymer comprises an acrylic polymer which is the reaction product of one or more acrylic monomers in which at least one monomer has a pendant silyl group. The acrylic polymer can be a homopolymer of a silyl group-containing acrylic monomer. In certain embodiments, however, such a polymer is a co-polymer of two or more acrylic monomers, one of which includes a pendant silyl group.

An acrylic monomer which includes a pendant silyl group which is suitable for use in the present invention, is an oxyalkylsilyl monomer having the general structure:

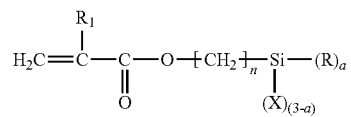

wherein $R_1$ is hydrogen or methyl, R is a hydrogen or a monovalent hydrocarbon group, X is alkoxy, acyloxy, phenoxy, or thioalkoxy, "n" is an integer, and "a" is an integer from 0 to 2, wherein if "a" is 2, the two R groups can be the same or different and when "a" is 0 or 1, the two or three X groups can be the same or different. In certain embodiments, X is alkoxy and "a" is 0. In certain embodiments the oxyalkylsilyl acrylic monomer is γ-methacryloxypropyltrimethoxysilane (SILQUEST® A-174 silane). Other suitable monomers comprising a pendant silyl group include vinylsilanes, such as vinyl triethoxysilane, vinyl trimethoxysilane, and the like. A second monomer that, optionally, can be co-polymerized with the acrylic monomer that comprises a pendant silyl group is any monomer different therefrom and which is copolymerizable therewith. Examples of suitable such monomers are, without limitation, methyl(meth)acrylate, ethyl(meth)acrylate, butyl(meth)acrylate, ethylhexyl(meth)acrylate, stearyl(meth)acrylate, benzyl(meth)acrylate, cyclohexyl(meth)acrylate, lauryl(meth)acrylate, isobornyl(meth)acrylate, hydroxypropyl(meth)acrylate, hydroxyethyl(meth)acrylate, hydroxybutyl(meth)acrylate, trifluoroethyl(meth)acrylate, pentafluoropropyl(meth)acrylate, perfluorocyclohexyl(meth)acrylate, (meth)acrylonitrile, glycidyl(meth)acrylate, (meth)acrylamide, alpha-ethyl(meth)acrylamide, N-butoxymethyl(meth)acrylamide, N,N-dimethyl acrylamide, N-methyl acrylamide, acryloyl morpholine and N-methylol (meth)acrylamide or combinations thereof.

In certain embodiments, the saturated polymer having silyl functional groups useful in the compositions of the invention has a weight average molecular weight (Mw) ranging from 1,000 to 50,000, such as 3,000 to 35,000 and, in some cases, 5,000 to 15,000 as determined by gel permeation chromatography using polystyrene standards. In certain embodiments, the saturated polymer has a silyl equivalent weight (defined as total weight of the polymer divided by the number of equivalents of silyl functional groups) of at least 150, such as at least 200, or, in some cases at least 300. In certain embodiments, the alkoxysilyl equivalent weight is no more than 2500, no more than 1500, no more than 700, or, in some cases, no more than 400.

In certain embodiments, the acrylic polymer comprising silyl functional groups that is utilized in certain embodiments of the coating compositions of the present invention is synthesized from a combination of unsaturated polymerizable materials comprising or, in some cases, consisting essentially of, (a) at least 10, such as at least 20, or, in some cases, at least 30 percent by weight of silyl-containing ethylenically unsaturated polymerizable material(s); and (b) not more than 90, not more than 80, or, in some cases, not more than 70 percent by weight of any monomer(s) different from a silyl-containing ethylenically unsaturated polymerizable material. In certain embodiments, such reactants used to produce such an acrylic polymer are substantially or, in some cases, completely free of vinyl acetate. As used herein, the term "substantially free" when used with reference to the substantial absence of vinyl acetate used to produce the foregoing acrylic polymer, means that such vinyl acetate is present in an amount less than 2 percent by weight, such as less than 1 percent by weight, based on the total weight of reactants used to make the acrylic polymer. In certain embodiments, the foregoing acrylic polymer is substantially free of acid and/or amine groups.

In certain embodiments, the acrylic polymer is formed by solution polymerization of the ethylenically unsaturated polymerizable material(s) in the presence of a polymerization initiator, such as azo compounds, such as alpha alpha'-azobis (isobutyronitrile), 2,2'-azobis(methylbutyronitrile) and 2,2'-azobis(2,4-dimethylvaleronitrile); peroxides, such as benzoyl peroxide, cumene hydroperoxide and t-amylperoxy-2-ethylhexanoate; tertiary butyl peracetate; tertiary butyl perbenzoate; isopropyl percarbonate; butyl isopropyl peroxy carbonate; and similar compounds. The quantity of initiator employed can be varied considerably; however, in most instances, it is desirable to utilize from 0.1 to 10 percent by weight of initiator based on the total weight of copolymerizable monomers employed. A chain modifying agent or chain transfer agent may be added to the polymerization mixture. The mercaptans, such as dodecyl mercaptan, tertiary dodecyl mercaptan, octyl mercaptan, hexyl mercaptan and the mercaptoalkyl trialkoxysilanes, such as 3-mercaptopropyl trimethoxysilane, may be used for this purpose as well as other chain transfer agents, such as cyclopentadiene, allyl acetate, allyl carbamate, and mercaptoethanol.

In certain embodiments, the polymerization reaction for the mixture of monomers to prepare the acrylic polymer is carried out in an organic solvent medium utilizing conventional solution polymerization procedures which are well known in the addition polymer art as illustrated with particularity in, for example, U.S. Pat. Nos. 2,978,437; 3,079,434 and 3,307,963, the relevant disclosures of which being incorporated by reference herein. Organic solvents which may be utilized in the polymerization of the monomers include virtually any of the organic solvents often employed in preparing acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms, including ethanol, propanol, isopropanol, and butanol; ether alcohols, such as ethylene glycol monoethyl ether, ethylene glycol monobutyl ether, propylene glycol monomethyl ether, and dipropylene glycol monoethyl ether; ketones, such as methyl ethyl ketone, methyl N-butyl ketone, and methyl isobutyl ketone; esters, such as butyl acetate; and aromatic hydrocarbons, such as xylene, toluene, and naphtha.

In certain embodiments, the polymerization of the ethylenically unsaturated components is conducted at from 0° C. to 150° C., such as from 50° C. to 150° C., or, in some cases, from 80° C. to 120° C.

In certain embodiments, the saturated polymer comprising silyl functional groups described above is present in the coating compositions of the present invention in an amount of up to 30 percent by weight, such as up to 20 percent by weight, based on the total weight of the composition. In certain embodiments, the saturated polymer comprising silyl functional groups described above is present in the coating compositions of the present invention in an amount of at least 1 percent by weight, such as at least 5 percent by weight, based on the total weight of the composition.

In certain embodiments, the coating compositions of the present invention comprise an ungelled, secondary amine-containing, Michael addition reaction product of reactants comprising a compound comprising more than one site of ethylenic unsaturation, i.e., a polyethylenically unsaturated compound, such as a poly(meth)acrylate, and an aminofunctional silane. As used herein, the term "(meth)acrylate" is intended to include both methacrylates and acrylates. As used herein, the term "secondary amine-containing" refers to compounds comprising a secondary amine, which is a functional group wherein two organic substituents are bound to a nitrogen together with one hydrogen. As used herein, the term "ungelled" refers to resins that are substantially free of crosslinking and have an intrinsic viscosity when dissolved in a suitable solvent, as determined, for example, in accordance with ASTM-D1795 or ASTM-D4243. The intrinsic viscosity of the resin is an indication of its molecular weight. A gelled resin, on the other hand, since it is of essentially infinitely high molecular weight, will have an intrinsic viscosity too high to measure. As used herein, a resin (or polymer) that is "substantially free of crosslinking" refers to a reaction product that has a weight average molecular weight (Mw), as determined by gel permeation chromatography, of less than 1,000,000.

In certain embodiments, the compound comprising more than one site of ethylenic unsaturation comprises a polyethylenically unsaturated monomer, such as di- and higher acrylates. Specific examples of suitable polyethylenically unsaturated monomers are diacrylates, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, and/or bisphenol A dimethacrylate; triacrylates, such as trimethylolpropane triacrylate, trimethylolpropane trimethacrylate, pentaerythritol monohydroxy triacrylate, and/or trimethylolpropane triethoxy triacrylate; tetraacrylates, such as pentaerythritol tetraacrylate, and/or di-trimethylolpropane tetraacrylate; and/or pentaacrylates, such as dipentaerythritol (monohydroxy) pentaacrylate.

In addition to or in lieu of the aforementioned polyethylenically unsaturated monomers, the compositions of the present invention may comprise the Michael addition reaction product of reactants comprising a polyethylenically unsaturated oligomer. As will be appreciated, the term "oligomer" and "polymer" are frequently used interchangeably. Although the term "oligomer" is generally used to describe a relatively short polymer, the term has no generally accepted definition with respect to the number of repeating monomer units. As used herein, therefore, in describing compounds comprising more than one site of ethylenic unsaturation, the terms "oligomer" and "polymer" are meant to be interchangeable.

Examples of some specific polyethylenically unsaturated oligomers suitable for use in the present invention include, for example, urethane acrylates, polyester acrylates and mixtures thereof, particularly those that are free of hydroxyl functional groups. Specific examples of such materials include urethane acrylates, such as Ebecryl 220 and Ebecryl 264 available from Cytec Surface Specialties Inc. and polyester acrylates, such as Ebecryl 80 available from UCB Chemicals.

As previously indicated, in certain embodiments of the coating compositions of the present invention, the compound(s) comprising more than one site of ethylenic unsaturation identified above is reacted with an aminofunctional silane. As used herein, the term "aminofunctional silane" refers to a compound having a molecular structure that includes an amine group and a silicon atom.

In certain embodiments, the aminofunctional silane utilized in the coating compositions of the present invention comprises a compound having the formula:

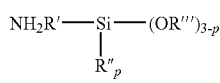

wherein R' is an alkylene group having from 2 to 10 carbon atoms, R" is an alkyl, aryl, alkoxy, or aryloxy group having from 1 to 8 carbon atoms, R'" is an alkyl group having from 1 to 8 carbon atoms, and p has a value of from 0 to 2. In certain embodiments of the present invention, R' is an alkylene group having from 2 to 5 carbon atoms and p is 0, the use of which the inventors have discovered is, in at least some embodiments, best for obtaining dust free films in 10 minutes or less and completely cured films within 24 hours, under the low temperature, moisture cure conditions described earlier.

Specific examples of aminofunctional silanes which are suitable for use in the present invention include aminoethyltriethoxysilane, γ-aminopropyltriethoxysilane, γ-aminopropylmethyldiethoxysilane, γ-aminopropylethyldiethoxysilane, 7-aminopropylphenyldiethoxysilane, γ-aminopropyltrimethoxysilane, δ-aminobutyltriethoxysilane, δ-aminobutylethyldiethoxysilane. In certain embodiments, the aminofunctional silane comprises a γ-aminopropyltrialkoxysilane.

In certain embodiments of the present invention, little or no other reactant, such as a polyamine, is added to the reactant mixture for the Michael addition reaction. As a result, in certain embodiments, the reactants taking part in the Michael addition reaction are substantially free, or, in some cases, completely free of any polyamine. As used herein, the term "polyamine" refers to compounds comprising two or more primary or secondary amino groups. As used herein, unless specifically stated otherwise, the term "substantially free" means that the material being discussed is present in a composition, if at all, as an incidental impurity. In other words, the material does not affect the properties of the composition. As used herein, the term "completely free" means that the material being discussed is not present in a composition at all. The inventors have discovered that the presence of any significant quantity of polyamine can, in at least some cases, result in increased yellowing, the generation of additional unwanted byproducts, and/or an undesirable accelerated building of viscosity in the Michael addition reaction product.

In certain embodiments, the ungelled Michael addition reaction product is formed by simply blending the reactants at room temperature or at a slightly elevated temperature, for example, up to 100° C. The reaction of an amine group with an ethylenically unsaturated group which occurs in this invention is often referred to as a Michael addition reaction. As a result, as used herein, the term "Michael addition reaction product" is meant to refer to the product of such a reaction. Such products can be more heat and light stable than greater acrylyl content-containing products. It should be recognized that slowly adding the aminofunctional silane to the compound comprising more than one site of ethylenic unsaturation results in there being a large excess of acrylate groups to aminofunctional silane. Unless the temperature of the reaction mixture is kept sufficiently low, a gelled product can be the result. It is sometimes better, therefore, to add the unsaturated material to a reaction vessel already containing an aminofunctional silane to obtain an ungelled reaction product. The reaction can be carried out in the absence of a solvent or in the presence of an inert solvent. Examples of suitable inert solvents are toluene, butyl acetate, methyl isobutyl ketone, and ethylene glycol monoethyl ether acetate. It is often desirable that the reaction be conducted in the absence of moisture or in a controlled amount of moisture to avoid unwanted side reactions and possibly gelation.

In certain embodiments, Michael addition reaction is conducted such that the equivalent ratio of the ethylenically unsaturated groups to the amine groups is at least 1:1, in some cases, at least 1.05:1.

In certain embodiments, the Michael addition reaction product identified above is present in the coating compositions of the present invention in an amount of at least 20 percent by weight, such as at least 30 percent by weight, such as at least 40 percent by weight, based on the total weight of the composition. In certain embodiments, the Michael addition reaction product identified above is present in the coating compositions of the present invention in an amount of no more than 80 percent by weight, such as no more than 60 percent by weight, with the weight percents being based on the total weight of the composition.

In certain embodiments, to produce the coating compositions of the present invention, the previously described Michael addition reaction product is combined with a Michael addition reaction product of reactants comprising, or, in some cases, consisting essentially of: (a) a compound comprising one site of ethylenic unsaturation, and (b) an aminofunctional silane.

In certain embodiments, the compound comprising one site of ethylenic unsaturation comprises a (meth)acrylate, including, for example, any $C_1$-$C_{30}$ aliphatic alkyl ester of (meth)acrylic acid, non-limiting examples of which include methyl(meth)acrylate, ethyl(meth)acrylate, propyl(meth)acrylate, N-butyl(meth)acrylate, t-butyl(meth)acrylate, 2-ethylhexyl(meth)acrylate, isobornyl(meth)acrylate, glycidyl(meth)acrylate, dimethylaminoethyl(meth)acrylate, N-butoxy methyl(meth)acrylamide, lauryl (meth)acrylate, cyclohexyl(meth)acrylate, and 3,3,5-trimethylcyclohexyl (meth)acrylate.

As previously indicated, in accordance with certain embodiments of the present invention, the compound(s) comprising one site of ethylenic unsaturation identified above is reacted with an aminofunctional silane. Suitable aminofunctional silanes for this purpose include any of the aminofunctional silanes previously identified herein.

In certain embodiments of the present invention, little or no other reactant, such as a polyamine, is added to the reactant mixture for the Michael addition reaction. As a result, in certain embodiments, the reactants taking part in the Michael addition reaction are substantially free, or, in some cases, completely free of any polyamine.

In certain embodiments, the Michael addition reaction is performed by simply blending the reactants at room temperature or at a slightly elevated temperature, for example, up to 100° C. The reaction can be carried out in the absence of a solvent or in the presence of an inert solvent. Examples of suitable inert solvents include any of the solvents previously identified herein.

In certain embodiments, Michael addition reaction is conducted such that the equivalent ratio of the ethylenically unsaturated groups to the amine groups is at least 1:1, in some cases, at least 1.05:1.

In certain embodiments, the Michael addition reaction product of the reaction between an aminofunctional silane and a compound comprising one site of ethylenic unsaturation identified above is present in the coating compositions of the present invention in an amount of up to 30 percent by weight, such as up to 25 percent by weight, based on the total weight of the composition. In certain embodiments, the Michael addition reaction product of the reaction between an aminofunctional silane and a compound comprising one site of ethylenic unsaturation identified above is present in the coating compositions of the present invention in an amount of at least 10 percent by weight, such as at least 15 percent by weight, based on the total weight of the composition.

In certain embodiments, the coating compositions of the present invention comprise a cyclic diamine according to the general structure (I):

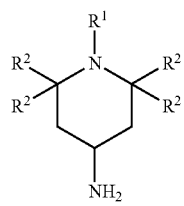

(I)

wherein $R^1$ and each $R^2$, which may be the same or different, represents H or a $C_1$ to $C_6$ alkyl group. In certain embodiments, $R^1$ is H or methyl. In certain embodiments, each $R^2$ is H or methyl. Specific examples of such compounds, which are suitable for use in the present invention, include 4-amino-2,2,6,6-tetramethylpiperidine, 4-amino-1,2,2,6,6-pentamethylpiperidine, and 4-aminopiperidine, as well as mixtures thereof.

In certain embodiments, the cyclic diamine according to the foregoing general structure is present in the coating compositions of the present invention in an amount of up to 20 percent by weight, such as up to 10 percent by weight, based on the total weight of the composition. In certain embodiments, the cyclic diamine according to the foregoing general structure is present in the coating compositions of the present invention in an amount of at least 0.1 percent by weight, such as at least 1 percent by weight, based on the total weight of the composition.

In certain embodiments, at least 50 percent, such as at least 60 percent, of the total secondary amine groups present in the coating compositions of the present invention are present on the ungelled, secondary amine-containing, Michael addition reaction product of reactants comprising: (i) a compound comprising more than one site of ethylenic unsaturation, and (ii) an aminofunctional silane. In certain embodiments, no more than 90 percent, such as no more than 75 percent, of the total secondary amine groups present in the coating compositions of the present invention are present on the foregoing Michael addition reaction product.

In certain embodiments, up to 40 percent, such as up to 20 percent, of the total secondary amine groups present in the coating compositions of the present invention are present on the Michael addition reaction product of reactants comprising: (a) a compound comprising one site of ethylenic unsaturation, and (b) an aminofunctional silane described earlier. In other embodiments, however, such a Michael addition reaction product is not present in the compositions of the present invention at all.

In certain embodiments, at least 10 percent, such as at least 20 percent, of the total amine groups present in the coating compositions of the present invention are present on the cyclic diamine of the foregoing general structure. In certain embodiments, no more than 50 percent, such as no more than 40 percent, of the total amine groups present in the coating compositions of the present invention are present on the cyclic diamine of the foregoing general structure (I).

In certain embodiments, particularly where the coating compositions is intended for use as a primer, the coating compositions of the present invention further comprise a phenalkamine. As will be appreciated, phenalkamines are a class of Mannich bases obtained by reacting a cardinol-containing extract derived from cashew nutshell liquid, an aldehyde compound, such as formaldehyde, and an amine. Commercially available phenalkamines often use ethylenediamine and diethyltriamine as the amine.

It is currently believed that the use of such a phenalkamine in combination with the cyclic diamine of the foregoing structure (I) can significantly increase the cure speed of the coating compositions described herein, particularly low VOC containing compositions, without, in some cases at least, significantly detrimentally impacting the flexibility of the resulting coating.

In certain embodiments, the phenalkamine is present in the coating compositions of the present invention in an amount of up to 20 percent by weight, such as up to 10 percent by weight, based on the total weight of the composition. In certain embodiments, the phenalkamine is present in the coating compositions of the present invention in an amount of at least 0.1 percent by weight, such as at least 1 percent by weight, based on the total weight of the composition.

As previously indicated, to produce the coating compositions of the present invention, the previously described Michael addition reaction product(s), cyclic diamine, and/or phenalkamine are combined with a compound comprising functional groups reactive with secondary amine groups. As will be appreciated by those skilled in the art, such functional groups include, but are not limited to, isocyanates, epoxies, and ethylenically unsaturated groups. In certain embodiments, such a compound is selected from a polyepoxide, a compound having two or more ethylenically unsaturated groups, or a mixture thereof.

As used herein, the term "polyepoxide" refers to an epoxy resin having at least two 1,2-epoxide groups per molecule. In certain embodiments, the epoxy equivalent weight ranges from 100 to 4000 based on solids of the polyepoxide, such as between 100 and 1000. The polyepoxides may be, for example, saturated or unsaturated, and may be, for example, aliphatic, alicyclic, aromatic, or heterocyclic. They may contain substituents such as, for example, halogens, hydroxyl groups, and ether groups.

Suitable classes of polyepoxides include epoxy ethers obtained by reacting an epihalohydrin, such as epichlorohydrin, with a polyphenol in the presence of an alkali. Suitable polyphenols include, for example, resorcinol, catechol, hydroquinone, bis(4-hydroxyphenyl)-2,2-propane (Bisphenol A), bis(4-hydroxyphenyl)-1,1-isobutane, bis(4-hydroxyphenyl)-1,1-ethane, bis(2-hydroxyphenyl)-methane, 4,4-dihydroxybenzophenone, and 1,5-dihydroxynaphthalene. In some cases, the diglycidyl ether of Bisphenol A is especially suitable.

Other suitable polyepoxides include polyglycidyl ethers of polyhydric alcohols and/or polyhydric silicones. Suitable polyhydric alcohols include, without limitation, ethylene glycol, propylene glycol, butylene glycol, 1,6-hexylene glycol, neopentyl glycol, diethylene glycol, glycerol, trimethylol propane, and pentaerythritol. These compounds may also be derived from polymeric polyols, such as polypropylene glycol.

Examples of other suitable polyepoxides include polyglycidyl esters of polycarboxylic acids. These compounds may be formed by reacting epichlorohydrin or another epoxy material with an aliphatic or aromatic polycarboxylic acid, such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (Dimer Acid) and polymeric polycarboxylic acids, such as carboxyl terminated acrylonitrile-butadiene rubber, may also be used in the formation of these polyglycidyl esters of polycarboxylic acids.

Polyepoxides derived from the epoxidation of an olefinically unsaturated alicyclic compound are also suitable for use in the coating compositions of the present invention. These polyepoxides are nonphenolic and are obtained by epoxidation of alicyclic olefins with, for example, oxygen, perbenzoic acid, acid-aldehyde monoperacetate, or peracetic acid. Such polyepoxides include the epoxy alicyclic ethers and esters well known in the art.

Other suitable polyepoxides include epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

Suitable polyepoxides also include epoxy-functional organopolysiloxanes, such as the resins described in U.S. Pat. No. 6,344,520 at col. 3, line 46 to col. 6, line 41, the cited portion of which being incorporated herein by reference.

The coating compositions of the present invention may contain one polyepoxide or a mixture of two or more polyepoxides.

As indicated, in certain embodiments, the compound comprising functional groups reactive with secondary amines groups comprises a compound having two or more ethylenically unsaturated groups. Suitable materials include the polyethylenically unsaturated monomers, such as the di- and higher acrylates described earlier.

In certain embodiments, however, such a compound comprises an oligomer containing polymerizable ethylenic unsaturation. Examples of such oligomers, which are suitable for use in the present invention, include polyurethane acrylates, polyester acrylates, polyether acrylates, polyacrylates derived from polyepoxides, and acrylate functional acrylic polymers. As will be appreciated by those skilled in the art, such oligomers can be prepared from polyurethane polyols, polyester polyols, polyether polyols, polybutadiene polyols, acrylic polyols, and epoxide resins by reacting all or portions of the hydroxyl groups or epoxy groups with acrylic or methacrylic acid. Also, polyols such as pentaerythritol and trimethylol 10 propane, propylene glycol, and ethylene glycol can be used. Acrylate functional compounds can also be obtained by transesterifying polyols with lower alcohol esters of (meth)acrylic acid.

In certain embodiments of the present invention, the compound comprising functional groups reactive with secondary amine groups comprises a tetrafunctional polyester acrylate, such as that which is commercially available from Sartomer under the tradename CN 2262.

The coating compositions of the present invention may contain one compound having two or more ethylenically unsaturated groups or a mixture of two or more compounds having two or more ethylenically unsaturated groups.

In certain embodiments of the present invention, the Michael addition reaction product(s), cyclic diamine, and/or phenalkamine (component 1) and the compound comprising functional groups reactive with secondary amine groups in component 1 (component 2) are present in the composition in amounts such that the molar ratio of secondary amine reactive groups in the composition to the reactive groups reactive therewith is 0.7 to 1.3, in some cases, 0.9 to 1.1, and, in yet other cases 1:1. Indeed, the present inventors have surprisingly discovered that in certain embodiments of the present invention wherein the aforementioned molar ratio is within such a range, the coating compositions are resistant to cracking after exposure to various environmental conditions, such as those described in the Examples, when applied so as to result in a dry film thickness of up to 20 mils, such as 1 to 20 mils. As used herein, the term "resistant to cracking" means that the completely cured coating exhibits no cracks visible to the naked eye at any distance.

In certain embodiments, the coating compositions of the present invention also comprise a polysiloxane. Suitable polysiloxanes include those of the formula:

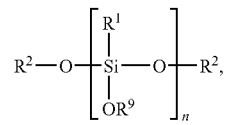

wherein each $R^1$ is independently selected from the group comprising alkyl and aryl radicals, $R^2$ and $R^9$ which may be identical or different, are selected each independently from the group comprising hydrogen, alkyl and aryl radicals, n is selected so that the molecular weight for the polysiloxane is in the range of from 400 to 10,000.

Suitable polysiloxanes include, but are not necessarily limited to, those having a molecular weight ranging from 500 to 6000 and an alkoxy content ranging from 10 to 50%.

Examples of suitable polysiloxanes include, but are not limited to, the alkoxy- and silanol-functional polysiloxanes known to those skilled in the art. Suitable alkoxy-functional polysiloxanes include, but are not limited to: Silres SY-550, and SY-231 from Wacker Silicone; and Rhodorsil Resin 10369 A, Rhodorsil 48V750, 48V3500 from Rhodia Silicones; and SF1147 from General Electrics. Suitable silanol-functional polysiloxanes include, but are not limited to, Silres SY 300, Silres SY 440, Silres MK and REN 168 from Wacker Silicone, Dow Corning's DC-840, DC-3074, DC3037, DC233 and DC-431 HS silicone resins and DC-Z-6018 intermediate and Rhodia Silicones' Rhodorsil Resin 6407 and 6482 X.

In certain embodiments, the previously described polysiloxane is present in the coating compositions of the present invention in an amount of up to 40 percent by weight, such as up to 30 percent by weight, based on the total weight of the composition. In certain embodiments, the previously described polysiloxane is present in the coating compositions of the present invention in an amount of at least 5 percent by weight, such as at least 10 percent by weight, based on the total weight of the composition.

The coating compositions of the present invention may also include a cure promoting catalyst, such as a base catalyst. Suitable base catalysts include triphenylphosphine, ethyltriphenyl phosphonium iodide, tetrabutyl phosphonium iodide and tertiary amines, such as benzyldimethylamine, dimethylaminocyclohexane, triethylamine, and the like, N-methylimidazole, and tetrabutyl ammonium hydroxide. When used, such catalysts are, in certain embodiments, present in an amount of 0.1 to 1 percent by weight, based on the total weight of the coating composition.

In certain embodiments, the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the coating compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions of the present invention can, if desired, be formulated with a variety of organic solvents, such as ketones, including methyl ethyl ketone, hydrocarbons, such as toluene and xylene, and mixtures thereof.

In certain embodiments, however, the coating compositions of the present invention are substantially free, or, in some cases, completely free of any solvent, such as an organic solvent or an aqueous solvent, i.e., water. Stated differently, in certain embodiments, the coating compositions of the present invention are substantially 100% active.

The coating compositions of the present invention can be utilized as one package compositions or as two package compositions. As two packs, one package comprises component 1 described above and the second pack comprises component 2 described above. The previously described additives and other materials can be added to either package as desired or necessary. The two packages are simply mixed together at or near the time of use.

In certain embodiments of the present invention, such as the previously described two package composition, the package comprising the component 1 also includes a moisture scavenger. Suitable moisture scavenging ingredients include calcium compounds, such as $CaSO_4$-½$H_2O$, metal alkoxides, such as tetraisopropyltitanate, tetra n butyl titanate-silanes, QP-53 14, vinylsilane (A171), and organic alkoxy compounds, such as triethyl orthoformate, trimethyl orthoformate, tetramethyl orthosilicate, and methylorthoformate.

In certain embodiments, the moisture scavenger is present in the package comprising component 1 in an amount of up to 10 percent by weight, such as 0.25 to 9.75 percent by weight, or, in some cases 5 percent by weight, based on the total weight of component 1.

The present invention is also directed to multi-pack coating compositions, wherein (A) a first pack comprises (1) an ungelled, secondary amine-containing, Michael addition reaction product of reactants comprising, or, in some cases, consisting essentially of: (a) a compound comprising more than one site of ethylenic unsaturation, and (b) an aminofunctional silane; (2) a saturated polymer comprising silyl functional groups as described above, and, optionally, (3) a cyclic diamine of the structure (I); and/or (4) a moisture scavenger; and (B) a second pack comprises a compound comprising functional groups reactive with secondary amine groups.

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co)polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface The coating compositions of the present invention can be applied to such substrates by any of a variety of methods including spraying, brushing, dipping, and roll coating, among other methods. In certain embodiments, however, the coating compositions of the present invention are applied by spraying and, accordingly, such compositions often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness. The coating compositions of the present invention may be pigmented or clear, and may be used alone or in combination as primers, basecoats, or topcoats.

The coating compositions of the present invention can be cured in a relatively short period of time to provide films that have good early properties which allow for handling of the coated objects without detrimentally affecting the film appearance and which ultimately cure to films which exhibit excellent hardness, solvent resistance and impact resistance. For example, the coating compositions of the present invention can dry in air at low temperatures to a dust free or tack free state in about 30 minutes, in some case 10 minutes or less. Thereafter, they will continue to cure in air at low temperatures so that a completely cured coating is formed in from, for example, 12 hours to 24 hours.

As a result, as previously indicated, the present invention is also directed to methods for coating a substrate. These methods comprise: (A) combining the contents of a first package and a second package, wherein (1) the first package comprises: (a) an ungelled, secondary amine-containing, Michael addition reaction product of reactants comprising, or, in some cases, consisting essentially of: (i) a compound comprising more than one site of ethylenic unsaturation, and (ii) an aminofunctional silane; and (b) a saturated polymer comprising silyl functional groups as described herein, (2) the second package comprises a compound comprising functional groups reactive with secondary amine groups, and (3) the contents of the first package and the second package are combined such that molar ratio of secondary amine groups to the functional groups reactive with the secondary amines in the resulting combination is 0.7 to 1.3; (B) applying the combination to at least a portion of the substrate; (C) allowing the combination to coalesce form a substantially continuous film; and (D) allowing the combination to completely cure within 24 hours in the presence of air having a relative humidity of 10 to 100 percent and a temperature −10 to 120° C.

Illustrating the invention are the following examples that are not to be considered as limiting the invention to their details. All parts and percentages in the examples, as well as throughout the specification, are by weight unless otherwise indicated.

Example 1

A saturated polymer comprising silyl functional groups was prepared using the ingredients and amounts identified in Table 1. To prepare the polymer, a reaction flask was equipped with a stirrer, thermocouple, nitrogen inlet, and a condenser. Charge A was then added and stirred with heat to reflux temperature (75° C. to 80° C.) under nitrogen atmosphere. To the refluxing solvent, charge B and charge C was simultaneously added over three hours. The reaction mixture was held at reflux condition for two hours. Charge D was then added over a period of 30 minutes. The reaction mixture was held at reflux condition for two hours and subsequently cooled to 30° C.

TABLE 1

|  | EXAMPLE 1 |
|---|---|
| Charge A (weight in grams) |  |
| Ethanol SDA 40B[1] | 234 |
| n-Butyl acetate | 0.0 |
| Charge B (weight in grams) |  |
| Mercapto ethanol | 12.4 |
| n-Butyl acrylate | 116.3 |
| n-butyl methacrylate | 58.6 |
| Silquest A-174[2] | 434.3 |
| Stearyl Methacrylate | 0.0 |
| Methyl Methacrylate | 0.0 |
| Charge C (weight in grams) |  |
| VAZO 67[3] | 24.4 |
| Ethanol SD A 40B | 150.2 |
| Charge D (weight in grams) |  |
| VAZO 67[3] | 6.5 |
| Ethanol SD A 40B | 50.0 |
| % solids | 58.08 |
| Theory silyl equivalent weight[4] | 372 |

[1]Denatured ethyl alcohol, 200 proof, available from Archer Daniel Midland Co.
[2]Gamma-methacryloxypropyltrimethoxysilane, available from Momentive
[3]2,2'-azo bis(2-methyl butyronitrile), available from E.I. Dupont de Nemours & Co., Inc
[4]Theory silyl equivalent weight = weight of (monomers + initiator + chaintransfer agents)/number of equivalents silyl functional groups.

Example 2

Coating compositions were prepared by combining the ingredients listed in Table 2 in a suitable container with moderate mixing.

TABLE 2

| Ingredient | Example 2A | Example 2B | Example 2C |
|---|---|---|---|
| Adduct 1[1] | 43.5 grams (0.127 eq) | 43.5 grams (0.127 eq) | 43.5 grams (0.127 eq) |
| Adduct 2[2] | 21.75 grams (0.073 eq) | 13.25 grams (0.045 eq) | 19 grams (0.063 eq) |
| Product of Example 1 | — | 23 grams | 8 grams |
| DBTDL[3] | 0.65 grams | 0.65 grams | 0.65 grams |
| Byk-333[4] | 0.4 grams | 0.4 grams | 0.4 grams |
| Silres ® SY 231[5] | 34.75 grams | 34.75 grams | 34.75 grams |
| Eponex 1510[6] | 34.75 grams (0.159 eq) | 34.75 grams (0.159 eq) | 34.75 grams (0.159 eq) |

[1]A reaction product of γ-aminopropyltrimethoxysilane (60% by weight) and 1,6-hexanediol diacrylate (40% by weight) prepared as described in Example 1 United States Patent Application Publication No. 2008/0075871.
[2]A reaction product of γ-aminopropyltrimethoxysilane (66.4% by weight) and methyl acrylate (33.6% by weight) prepared as described in Example 2 United States Patent Application Publication No. 2008/0075871.
[3]Dibutyltin dilaurate
[4]Polyether modified polydimethylsiloxane surface additive commercially available from Byk-Chemie
[5]Methoxyfunctional silicone commercially available from Wacker Silicones.
[6]Epoxy resin commercially available from Hexion Example 3

The coating compositions of Example 2 were coated onto Bonderite 1000 CRS at film thicknesses of 2 mils. The coated substrates were allowed to stand under ambient conditions and evaluated for tack-free time using a cotton ball. At 6 hours the panels were evaluated for scratch resistance. At 24 hours the panels were evaluated for scratch resistance and adhesion. Results are set forth in Table 3.

TABLE 3

| Test | Example 3A | Example 3B | Example 3C |
|---|---|---|---|
| Tack-free time[1] | 16 minutes | 14 minutes | 16 minutes |
| 6-hour scratch resistance[2] | 2 | 1 | 1 |
| 24-hour scratch resistance | 1 | 1 | 1 |
| Adhesion @ 24 hours (ASTM D3359) | 1B | 3B | 4B |
| 20° Gloss | 90 | 84 | 89 |

[1]Tack-free time refers to the time in minutes where a cotton ball is run across the coating with none of the cotton sticking to the surface. A Q-tip can also be used.
[2]Scratch resistance test was done using a wood applicator stick or popsicle stick and scratching it across the surface of the coating, noting the severity of the scratch and whether or not it breaks through the paint.
The rating (1-5) was as follows:
1 = no evidence of scratch,
2 = some scratching,
3 = moderate scratching but does not break through coating,
4 = some coating removal with effort,
5 = easy removal of coating.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition comprising a binder comprising:
   (a) a saturated polymer comprising silyl functional groups and having a silyl equivalent weight of at least 150;
   (b) an ungelled, secondary amine-containing, Michael addition reaction product of reactants comprising:
      (i) a compound comprising more than one site of ethylenic unsaturation, and
      (ii) an aminofunctional silane; and
   (c) a compound comprising functional groups reactive with the secondary amine groups.

2. The coating composition of claim 1, wherein the saturated polymer has a silyl equivalent weight of at least 300.

3. The coating composition of claim 1, wherein the saturated polymer comprises an acrylic polymer.

4. The coating composition of claim 3, wherein the acrylic polymer is synthesized from a combination of unsaturated polymerizable materials comprising:
   (1) at least 10 percent by weight of silyl-containing ethylenically unsaturated polymerizable material(s); and
   (2) not more than 90 percent by weight of any monomer(s) different from a silyl-containing ethylenically unsaturated polymerizable material,
   wherein the weight percents are based on the total weight of unsaturated polymerizable materials.

5. The coating composition of claim 4, wherein the silyl-containing ethylenically unsaturated polymerizable material comprises an oxyalkylsilyl monomer having the general structure:

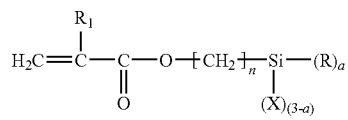

wherein $R_1$ is hydrogen or methyl, R is a hydrogen or a monovalent hydrocarbon group, X is alkoxy, acyloxy, phenoxy, or thioalkoxy, "n" is an integer, and "a" is an integer from 0 to 2, wherein if "a" is 2, the two R groups can be the same or different and when "a" is 0 or 1, the two or three X groups can be the same or different.

6. The coating composition of claim 4, wherein the silyl-containing ethylenically unsaturated polymerizable material is present in an amount of at least 30 percent by weight, based on the total weight of the combination of unsaturated polymerizable materials.

7. The coating composition of claim 1, wherein polymer (a) is present in an amount of 1 to 30 percent by weight, based on the total weight of the coating composition.

8. The coating composition of claim 1, wherein components (b) and (c) are present in the composition in amounts such that the molar ratio of secondary amine groups to functional groups reactive with secondary amine groups is 0.7 to 1.3.

9. The coating composition of claim 1, wherein the aminofunctional silane comprises a compound having the formula:

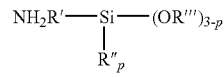

wherein R' is an alkylene group having from 2 to 10 carbon atoms, R" is an alkyl, aryl, alkoxy, or aryloxy group having from 1 to 8 carbon atoms, R''' is an alkyl group having from 1 to 8 carbon atoms, and p has a value of from 0 to 2.

10. The coating composition of claim 9, wherein R' is an alkylene group having from 2 to 5 carbon atoms and p is 0.

11. The coating composition of claim 10, wherein the aminofunctional silane comprises γ-aminopropyltrimethoxysilane.

12. The coating composition of claim 1, wherein the Michael addition reaction product is the product of reactants consisting essentially of: (a) a compound comprising more than one site of ethylenic unsaturation, and (b) an aminofunctional silane.

13. The coating composition of claim 1, wherein component (b) is present in the composition in an amount of at least 20 percent by weight, based on the total weight of the coating composition.

14. The coating composition of claim 1, wherein the compound comprising functional groups reactive with the secondary amines in the Michael addition reaction product is selected from a polyepoxide, a compound having two or more ethylenically unsaturated groups, or a mixture thereof.

15. The coating composition of claim 14, wherein the compound comprising functional groups reactive with the secondary amines in the Michael addition reaction product comprises a polyepoxide.

16. The coating composition of claim 15, wherein the polyepoxide is saturated.

17. The coating composition of claim 16, wherein the polyepoxide is an epoxy ether obtained by reacting an epihalohydrin with a polyphenol.

18. The coating composition of claim 1, wherein the binder further comprises a polysiloxane.

19. A substrate at least partially coated with a coating deposited from the coating composition of claim 1.

20. A method for using the coating composition of claim 1, comprising:
   (a) depositing the coating composition of claim 1 onto at least a portion of the substrate;
   (b) allowing the coating composition to coalesce to form a substantially continuous film; and
   (c) exposing the film to air having a relative humidity of 10 to 100 percent and a temperature of −10 to 120° C.

* * * * *